United States Patent [19]

Kitamura

[11] 4,208,994

[45] Jun. 24, 1980

[54] THERMALLY RESPONSIVE VALVE

[75] Inventor: Kazuhiko Kitamura, Toyota, Japan

[73] Assignee: Aisin Seiki Kabushiki Kaisha, Aichi, Japan

[21] Appl. No.: 928,968

[22] Filed: Jul. 28, 1978

[30] Foreign Application Priority Data

Jul. 28, 1977 [JP] Japan ................... 52/90740

[51] Int. Cl.² ............... F02M 25/06; G05D 23/02
[52] U.S. Cl. ................... 123/119 A; 173/117 A; 236/92 R; 236/87; 236/101 R; 137/468
[58] Field of Search ............ 123/119 A, 117 A; 236/92, 87, 101; 137/468

[56] References Cited

U.S. PATENT DOCUMENTS

| | | | |
|---|---|---|---|
| 3,804,326 | 4/1974 | McIntire | 123/117 A |
| 4,027,633 | 6/1977 | Otsubo et al. | 123/117 A |
| 4,068,800 | 1/1978 | Doherty, Jr. | 123/117 A |
| 4,140,275 | 2/1979 | Inada | 123/117 A |

*Primary Examiner*—Wendell E. Burns
*Attorney, Agent, or Firm*—Oblon, Fisher, Spivak, McClelland & Maier

[57] ABSTRACT

A thermally responsive valve composed of a first fluid passage whose inlet is connected to a carburetor advance port and whose outlet communicates with a chamber; a second fluid passage whose inlet communicates with the chamber and whose outlet is connected to an airtight chamber of a control valve; a bimetal in the chamber cooperating with a sealing member to close the outlet of the first passage when the temperature of the bimetal exceeds a predetermined value; and a one-way check valve disposed in second fluid passage to permit fluid flow from the first passage to the second passage. When the valve temperature exceeds a predetermined value, the bimetal will snap over to communicate the first and second passages so that the vacuum from the carburetor advance port can act upon the control valve.

6 Claims, 2 Drawing Figures

THERMALLY RESPONSIVE VALVE

BACKGROUND OF THE INVENTION

1. Field of the Invention

This invention relates to thermally responsive valves having bimetal means which are operable to open or close fluid flow passages in response to variations in temperature.

2. Description of the Prior Art

The prior art is illustrated by U.S. Pat. No. 4,068,800.

SUMMARY OF THE INVENTION

The apparatus of this invention consists of a thermally responsive valve composed of a first fluid passage whose inlet is connected to a carburetor advance port and whose outlet communicates with a chamber; a second fluid passage whose inlet communicates with the chamber and whose outlet is connected to an airtight chamber of a control valve; a bimetal in the chamber cooperating with a sealing member to close the outlet of the first passage when the temperature of the bimetal exceeds a predetermined value; and a one-way check valve disposed in the second fluid passage to permit fluid flow from the first passage to the second passage. When the valve temperature exceeds a predetermined value, the bimetal will snap over to communicate the first and second passages so that the vacuum from the carburetor advance port can act upon the control valve.

BRIEF DESCRIPTION OF THE DRAWINGS

Various other objects and many of the attendant advantages of the present invention will be readily appreciated as the same becomes better understood by reference to the following detailed description when considered in connection with the accompanying drawings, in which like reference characters designate the same or similar parts throughout the figures thereof and wherein.

DETAILED DESCRIPTION OF THE PREFERRED EMBODIMENTS

Figure 1:
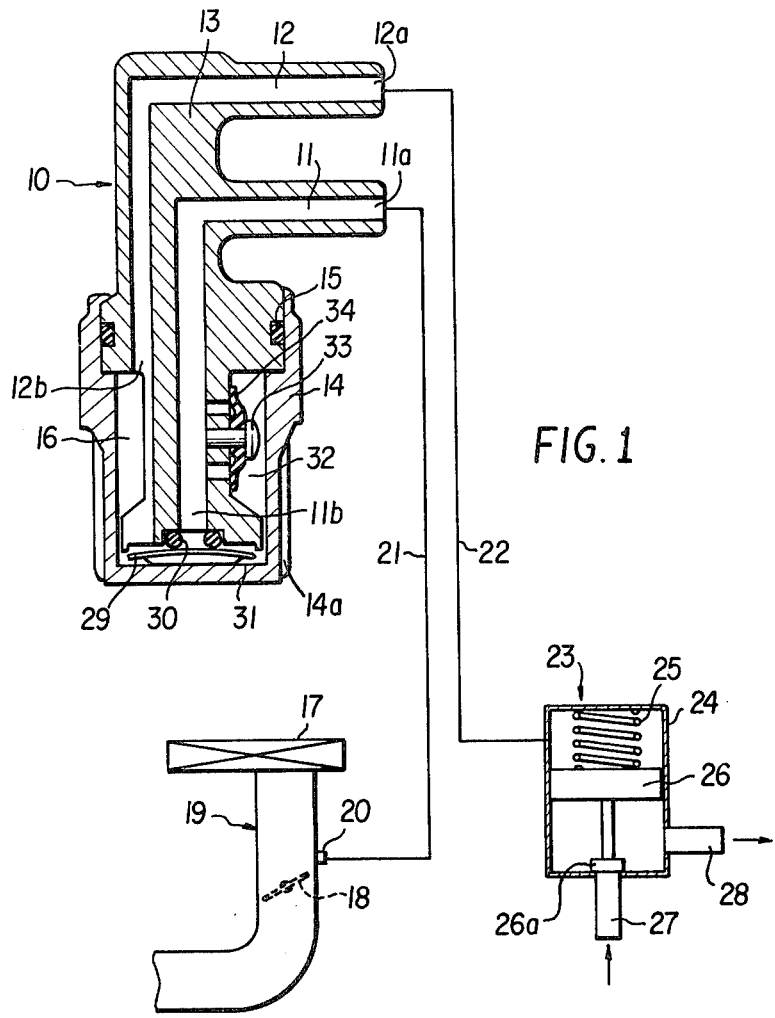
FIG. 1 shows a schematic representation of one embodiment of the valve.

A thermally responsive valve 10 has a first body 13 having therein first and second fluid passages 11 and 12 and a second body 14. Two bodies 13 and 14 are fluid-tightly engaged with each other by means of an O-ring 15 to form a fluid chamber 16 therebetween.

One end 11a of the first fluid passage 11 is connected to an advance port 20 of a carburetor through pipe 21. Numeral 17 indicates an air cleaner while numeral 18 indicates a throttle valve 18. As is well known, the throttle valve 18 is connected to a (not shown) gas pedal and the carburetor 19 is in communication with an intake manifold (not shown either).

The other end 11b of the first fluid passage 11 faces the fluid chamber 16 through bimetal valve means, details of which will be described hereinafter. One end 12a of the second fluid passage 12 is connected to a chamber 24 of a vacuum control valve 23 via pipe 22 and the other end 12b of the second fluid passage 12 faces the fluid chamber 16 directly.

The vacuum control valve 23 includes a diaphragm piston 26, a spring 25 always biasing the piston 26 in one direction (in a downward direction as viewed in FIG. 1), and a valve member 26a which opens or closes an inlet port 27 in response to movement of the diaphragm piston 26. Numeral 28 is an outlet port and is connected to the intake manifold. The inlet port 27 is connected to an exhaust manifold, not shown, for recirculation of exhaust gases therein to the intake manifold through the valve member 26a.

The bimetal valve means includes a ring shaped seal member 30 disposed between the end 11b of the first flow passage 11 and the fluid chamber 16, and a bimetal 29 which is biased to engage with the seal member 30 through a biasing force of spring 31 which is secured to the bottom of the chamber 16. The bimetal 29 is designed to snap over to be separated from the seal member 30 when the temperature surrounding the chamber 16 of the thermally responsive valve 10 exceeds a predetermined value. Of course, the bimental 29 could also be designed to be initially separated from the seal member 30 and to snap over to engage the seal member when the surrounding temperature exceeds a predetermined value. The second body 14 has a screw portion 14a which is threaded into a water jacket (not shown) containing engine cooling water therein. Thus, the bimetal 29 is actuated in response to the temperature of engine cooling water in this embodiment. A check valve 33 is provided between the first fluid passage 11 and the fluid chamber 16 for allowing fluid in the passage 11 to enter the chamber 16 through hole 32, but restricting fluid in the chamber 16 from entering the passage 11. The check valve 33 includes a valve member 34 which normally closes the hole 32.

The operation of the valve is as follows:

When the gas pedal is depressed, the throttle valve 18 is opened to create a vacuum in the intake manifold and the advance port 20 of the carburetor 19. The vacuum is then transmitted to the first fluid passage 11 through the pipe 21.

Under such conditions, when the temperature of the water in the water jacket is below the predetermined value, the bimetal 29 does not snap over but maintains its engagement with the sealing member 30.

When the temperature of the water reaches the predetermined value, the bimetal 29 snaps over to separate from the sealing member 30. Then the vacuum from the advance port 20 is further transmitted to the chamber 24 of the vacuum control valve 23 through the fluid chamber 16, second fluid passage 12, and pipe 22. The piston 26 is then moved upward due to the pressure difference and the valve 26a opens to establish communication between inlet and outlet ports 27, 28.

Figure 2:
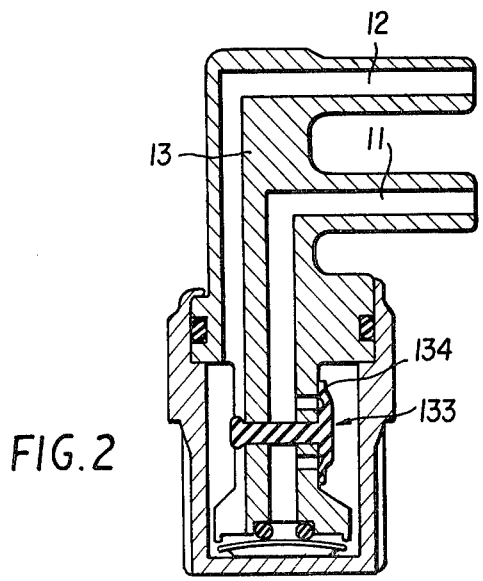
FIG. 2 shows a second embodiment of the valve.

When the gas pedal is not depressed or the ignition switch is in an OFF condition, the first fluid passage 11 communicates with atmospheric pressure from the air cleaner 17 through advance port 20, while the second fluid passage 12 and the fluid chamber 16 are under atmospheric pressure. Since the engine is not ON, the water in the water jacket does not reach the predetermined value. Thus the bimetal 29 maintains its closed position. Under such conditions, when the temperature surrounding the thermally responsive value 10 is extremely reduced, the atmospheric pressure in the second fluid passage 12, chambers 16 and 24 contracts to generate a vacuum therein. However, since the first fluid passage 11 is connected to the air cleaner 17, it maintains the atmospheric pressure level. Therefore, due to the pressure difference between the first fluid passage 11 and the fluid chamber 16, the check valve 33 opens the hole 32 to compensate for the reduced pressure in the chamber 16 and chamber 24 of the control valve 23. After the pressures between chamber 16 and passage 11 equalize, the valve member 34 closes due to its resiliency. FIG. 2 shows another embodiment of the thermally responsive valve, wherein a check valve 133 comprises a stem portion which is formed integrally with a valve portion 134.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermally responsive valve comprising:
    a first fluid passage means including an inlet port;
    a second fluid passage means including an outlet port;
    a first seal member disposed between said first and second fluid passage means;
    a bimetal normally engaging with said seal member for interrupting communication between said first and second fluid passage means, said bimetal being snapped over to be separated from said seal member when the temperature surrounding the valve exceeds a predetermined value; and
    a second check valve assembly separately formed from and distinct from said first seal member and disposed in said second fluid passage means for allowing the fluid in said first fluid passage means to flow into said second fluid passage means when the pressure of the fluid in said second fluid passage means is reduced to a pressure below that in said first fluid passage means, said check valve assembly preventing fluid flow from said second to said first fluid passage means.

2. A thermally responsive valve as set forth in claim 1, wherein said second fluid passage means further includes a chamber within which is disposed said check valve assembly.

3. A thermally responsive valve as set forth in claim 2, wherein said inlet port is connected to a variable pressure source while said outlet port is connected to a constant pressure source.

4. A thermally responsive valve as set forth in claim 3, wherein said inlet port is connected to an advance port of a carburetor while said outlet port is connected to an airtight chamber of a control device.

5. A thermally responsive valve comprising:
    a first fluid passage means including an inlet port;
    a second fluid passage means including an outlet port;
    a first seal member disposed between said first and second fluid passage means;
    a bimetal normally separated from said seal member for permitting communication between said first and second fluid passage means, said bimetal being snapped over to be engaged with said seal member when the temperature surrounding the valve exceeds a predetermined value; and
    a second check valve assembly separately formed from and distinct from said seal member and disposed in said second fluid passage means for allowing the fluid in said first fluid passage means to flow into said second fluid passage means when the pressure of the fluid in said second fluid passage means is reduced to a pressure below that in said first fluid passage means, said check valve assembly preventing fluid flow from said second to said first fluid passage means.

6. The valve of claim 1 or 5 including a housing within which said valve is positioned, said housing including external fixing means at one end adapted for fixing said one end in a water jacket, said temperature surrounding said valve being a function of the temperature of the water in said water jacket.

* * * * *